(12) United States Patent
Jeon et al.

(10) Patent No.: US 10,288,954 B2
(45) Date of Patent: May 14, 2019

(54) DISPLAY DEVICE

(71) Applicant: SAMSUNG DISPLAY CO., LTD., Yongin-si, Gyeonggi-do (KR)

(72) Inventors: Kyunghwan Jeon, Hwaseong-si (KR); Kwanghyun Kim, Gunpo-si (KR); Yun Jang, Asan-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 15/825,422

(22) Filed: Nov. 29, 2017

(65) Prior Publication Data

US 2018/0157078 A1  Jun. 7, 2018

(30) Foreign Application Priority Data

Dec. 1, 2016 (KR) .................. 10-2016-0162804

(51) Int. Cl.
*G02F 1/1335* (2006.01)
*G02F 1/1343* (2006.01)
*G02F 1/13363* (2006.01)

(52) U.S. Cl.
CPC ...... *G02F 1/1343* (2013.01); *G02F 1/133514* (2013.01); *G02F 1/133528* (2013.01); *G02F 1/133617* (2013.01); *G02F 1/133634* (2013.01); *G02F 2001/133531* (2013.01)

(58) Field of Classification Search
CPC .............. G02F 1/133528; G02F 2001/133531
See application file for complete search history.

(56) References Cited

U.S. PATENT DOCUMENTS

| | | | |
|---|---|---|---|
| 9,188,809 B2 | 11/2015 | Kang et al. | |
| 9,513,509 B2 | 12/2016 | Kim et al. | |
| 2004/0201795 A1* | 10/2004 | Paukshto | G02B 5/3016 349/96 |
| 2015/0205157 A1* | 7/2015 | Sakai | G02F 1/13363 349/62 |
| 2018/0088369 A1* | 3/2018 | Kim | G02F 1/133509 |
| 2018/0107028 A1* | 4/2018 | Jung | G02F 1/0063 |

FOREIGN PATENT DOCUMENTS

| | | |
|---|---|---|
| KR | 1020100037033 A | 4/2010 |
| KR | 1020140106936 A | 9/2014 |
| KR | 1020150010042 A | 1/2015 |
| KR | 1020160003275 A | 1/2016 |

* cited by examiner

*Primary Examiner* — Phu Vu
(74) *Attorney, Agent, or Firm* — Cantor Colburn LLP

(57) ABSTRACT

A display device includes a first substrate, a first electrode on a first surface of the first substrate, a first polarizing plate on a second surface of the first substrate which faces the first surface, a liquid crystal layer on the first electrode, a second polarizing plate on the liquid crystal layer, a color conversion layer on the second polarizing plate, the color conversion layer including a plurality of color conversion portions, and a second substrate on the color conversion layer. The first polarizing plate includes a first polarizer, a phase compensation layer and a second polarizer which are sequentially disposed, and an absorption axis of the first polarizer and an absorption axis of the second polarizer are parallel to each other.

15 Claims, 8 Drawing Sheets

DISPLAY DEVICE

This application claims priority to Korean Patent Application No. 10-2016-0162804, filed on Dec. 1, 2016, and all the benefits accruing therefrom under 35 U.S.C. § 119, the content of which in its entirety is herein incorporated by reference.

1. Field

Exemplary embodiments of the invention relate to a display device, and more particularly, to a display device including a liquid crystal layer and a phase compensation layer and a method of manufacturing the display device.

2. Discussion of Related Art

Liquid crystal display ("LCD") devices are one of most widely used types of flat panel display ("FPD") devices. An LCD device includes two substrates including electrodes formed thereon and a liquid crystal layer interposed therebetween.

Upon applying voltages respectively to the two electrodes, liquid crystal molecules of the liquid crystal layer are rearranged such that an amount of transmitted light is controlled in the LCD device. The LCD device includes a color filter for expressing color.

In recent times, studies on display devices, in which a color filter which is used in a conventional LCD device is replaced with a color conversion layer including fluorescent elements, have been conducted. A display device including the color conversion layer is referred to as a photo-luminescent display ("PLD") device. The PLD device includes a polarizing plate between a color conversion layer and a liquid crystal layer.

SUMMARY

Pixels constituting photo-luminescent display ("PLD") devices are sensitive to side light. Accordingly, it is necessary to substantially prevent unnecessary light emission of the pixel caused by the side light.

Exemplary embodiments of the invention may be directed to a display device having excellent color expression capability by substantially preventing unnecessary light emission of pixels caused by side light.

According to an exemplary embodiment, a display device includes a first substrate, a first electrode on a first surface of the first substrate, a first polarizing plate on a second surface of the first substrate which faces the first surface, a liquid crystal layer on the first electrode, a second polarizing plate on the liquid crystal layer, a color conversion layer on the second polarizing plate, the color conversion layer including a plurality of color conversion portions, and a second substrate on the color conversion layer. The first polarizing plate includes a first polarizer, a phase compensation layer and a second polarizer which are sequentially disposed, and an absorption axis of the first polarizer and an absorption axis of the second polarizer are parallel to each other.

In an exemplary embodiment, the phase compensation layer may have a thickness direction retardation value in a range from about 450 nanometers (nm) to about 650 nm.

In an exemplary embodiment, the phase compensation layer may include a C-plate.

In an exemplary embodiment, the phase compensation layer may include at least one of cycloolefin polymer ("COP"), triacetyl cellulose ("TAC"), polycarbonate ("PC"), polystyrene ("PS") and a liquid crystal compensation film.

In an exemplary embodiment, the first polarizer and the second polarizer may include polyvinyl alcohol.

In an exemplary embodiment, the first polarizer may be a luminance enhancement film having a polarization function.

In an exemplary embodiment, the color conversion layer may include a phosphor.

In an exemplary embodiment, the phosphor may include quantum dots.

In an exemplary embodiment, the color conversion layer may further include a red color conversion portion which absorbs a blue light and emits a red light, and a green color conversion portion which absorbs a blue light and emits a green light.

In an exemplary embodiment, the color conversion layer may further include a transmissive portion that transmits a blue light.

In an exemplary embodiment, the display device may further include a yellow color filter between the red color conversion portion and the second substrate and between the green color conversion portion and the second substrate.

In an exemplary embodiment, the display device may further include a dichroic reflection layer between the second polarizing plate and the color conversion layer.

In an exemplary embodiment, the display device may further include a retardation plate between the first polarizer and the first substrate.

According to an exemplary embodiment, a display device includes a first substrate, a first electrode on a first surface of the first substrate, a first polarizing plate on a second surface of the first substrate which faces the first surface, a liquid crystal layer on the first electrode, a second substrate on the liquid crystal layer, and a color filter layer on one of the first substrate and the second substrate. The first polarizing plate includes a first polarizer, a phase compensation layer and a second polarizer which are sequentially disposed, and an absorption axis of the first polarizer and an absorption axis of the second polarizer are parallel to each other.

According to an exemplary embodiment, a display device includes a first substrate, a phase compensation layer on a first surface of the first substrate, a first polarizer on the phase compensation layer, a second polarizer on a second surface of the first substrate which faces the first surface, a first electrode on the second polarizer, a liquid crystal layer on the first electrode, a second polarizing plate on the liquid crystal layer, a color conversion layer on the second polarizing plate, the color conversion layer including a plurality of color conversion portions, and a second substrate on the color conversion layer. An absorption axis of the first polarizer and an absorption axis of the second polarizer are parallel to each other.

The foregoing is illustrative only and is not intended to be in any way limiting. In addition to the illustrative exemplary embodiments and features described above, further exemplary embodiments and features will become apparent by reference to the drawings and the following detailed description.

BRIEF DESCRIPTION OF THE DRAWINGS

A more complete appreciation of the invention will become more apparent by describing in detail exemplary embodiments thereof with reference to the accompanying drawings, in which.

DETAILED DESCRIPTION

Exemplary embodiments will now be described more fully hereinafter with reference to the accompanying drawings. Although the invention may be modified in various manners and have several exemplary embodiments, exemplary embodiments are illustrated in the accompanying drawings and will be mainly described in the specification. However, the scope of the invention is not limited to the exemplary embodiments and should be construed as including all the changes, equivalents and substitutions included in the spirit and scope of the invention.

In the drawings, thicknesses of a plurality of layers and areas are illustrated in an enlarged manner for clarity and ease of description thereof. When a layer, area, or plate is referred to as being "on" another layer, area, or plate, it may be directly on the other layer, area, or plate, or intervening layers, areas, or plates may be present therebetween. Conversely, when a layer, area, or plate is referred to as being "directly on" another layer, area, or plate, intervening layers, areas, or plates may be absent therebetween. Further when a layer, area, or plate is referred to as being "below" another layer, area, or plate, it may be directly below the other layer, area, or plate, or intervening layers, areas, or plates may be present therebetween. Conversely, when a layer, area, or plate is referred to as being "directly below" another layer, area, or plate, intervening layers, areas, or plates may be absent therebetween.

The spatially relative terms "below", "beneath", "lower", "above", "upper" and the like, may be used herein for ease of description to describe the relations between one element or component and another element or component as illustrated in the drawings. It will be understood that the spatially relative terms are intended to encompass different orientations of the device in use or operation, in addition to the orientation depicted in the drawings. For example, in the case where a device illustrated in the drawing is turned over, the device positioned "below" or "beneath" another device may be placed "above" another device. Accordingly, the illustrative term "below" may include both the lower and upper positions. The device may also be oriented in the other direction and thus the spatially relative terms may be interpreted differently depending on the orientations.

Throughout the specification, when an element is referred to as being "connected" to another element, the element is "directly connected" to the other element, or "electrically connected" to the other element with one or more intervening elements interposed therebetween. It will be further understood that the terms "comprises," "including," "includes" and/or "including," when used in this specification, specify the presence of stated features, integers, steps, operations, elements and/or components, but do not preclude the presence or addition of one or more other features, integers, steps, operations, elements, components and/or groups thereof.

It will be understood that, although the terms "first," "second," "third," and the like may be used herein to describe various elements, these elements should not be limited by these terms. These terms are only used to distinguish one element from another element. Thus, "a first element" discussed below could be termed "a second element" or "a third element," and "a second element" and "a third element" may be termed likewise without departing from the teachings herein.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 10%, 5% of the stated value.

Unless otherwise defined, all terms used herein (including technical and scientific terms) have the same meaning as commonly understood by those skilled in the art to which this invention pertains. It will be further understood that terms, such as those defined in commonly used dictionaries, should be interpreted as having a meaning that is consistent with their meaning in the context of the relevant art and will not be interpreted in an ideal or excessively formal sense unless clearly defined in the specification.

Some of the parts which are not associated with the description may not be provided in order to specifically describe embodiments of the invention and like reference numerals refer to like elements throughout the specification.

Hereinafter, an exemplary embodiment will be described with reference to FIGS. 1, 2, 3 and 4.

Figure 1:
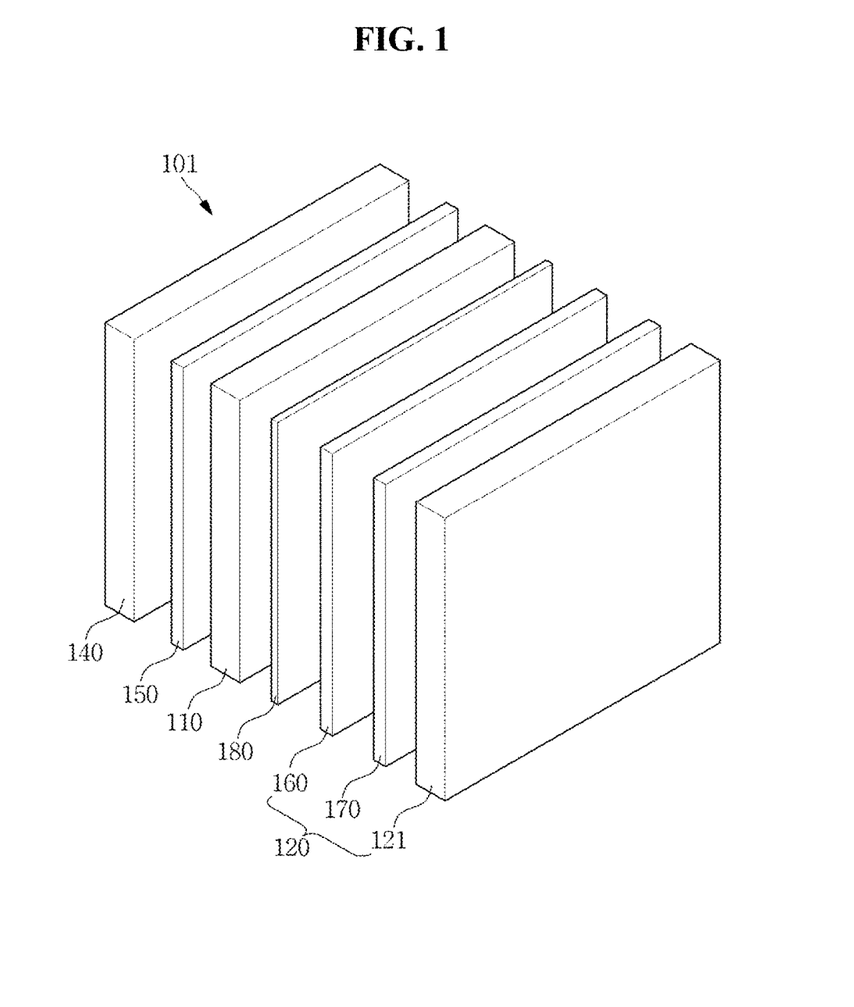
FIG. 1 is an exploded perspective view illustrating an exemplary embodiment of a display device.

FIG. 1 is an exploded perspective view illustrating a display device 101 according to an exemplary embodiment.

Referring to FIG. 1, the display device 101 according to an exemplary embodiment includes a backlight unit 140, a first polarizing plate 150, a display substrate 110, a liquid crystal layer 180 and an opposing substrate 120 which are sequentially stacked. The opposing substrate 120 includes a second polarizing plate 160, a color conversion layer 170, and a second substrate 121.

The backlight unit 140 may irradiate ultraviolet ("UV") rays, near UV rays, or the like. The backlight unit 140 may irradiate, for example, a white light or a blue light to the display substrate 110. Hereinafter, exemplary embodiments will be described with respect to a display device including the backlight unit 140 that emits a blue light.

Figure 2:
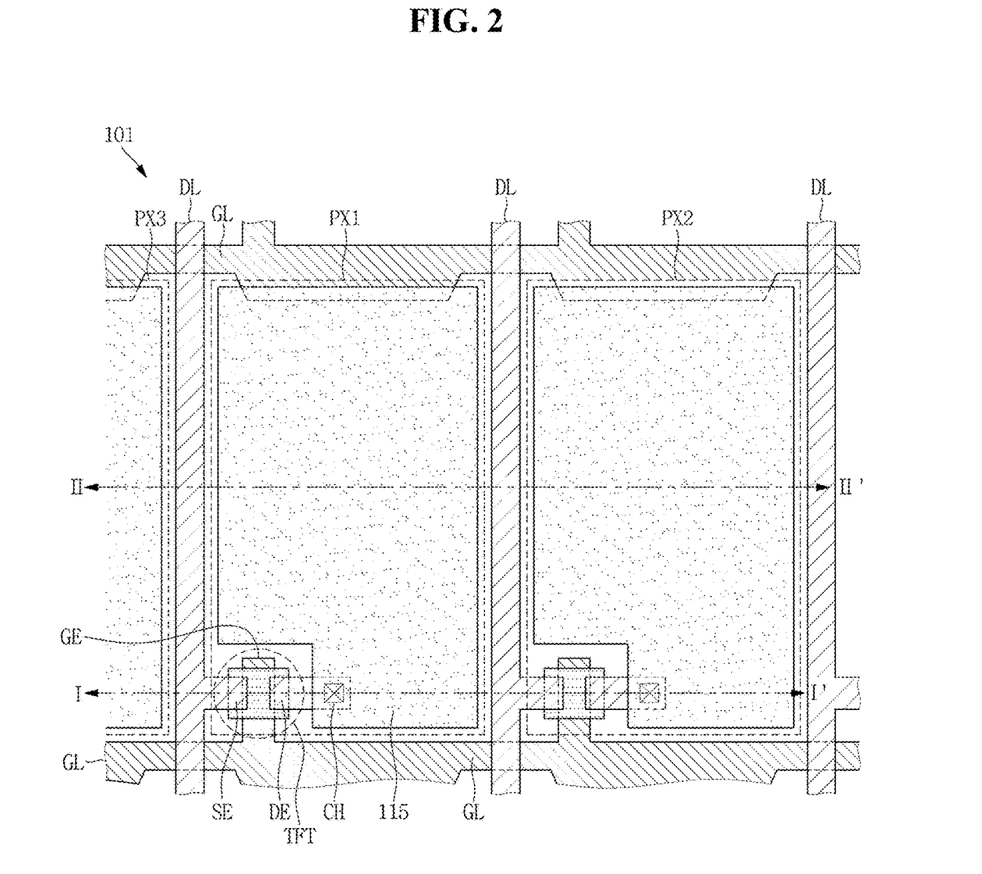
FIG. 2 is a plan view illustrating a pixel of the display device illustrated in FIG. 1.
Figure 3:
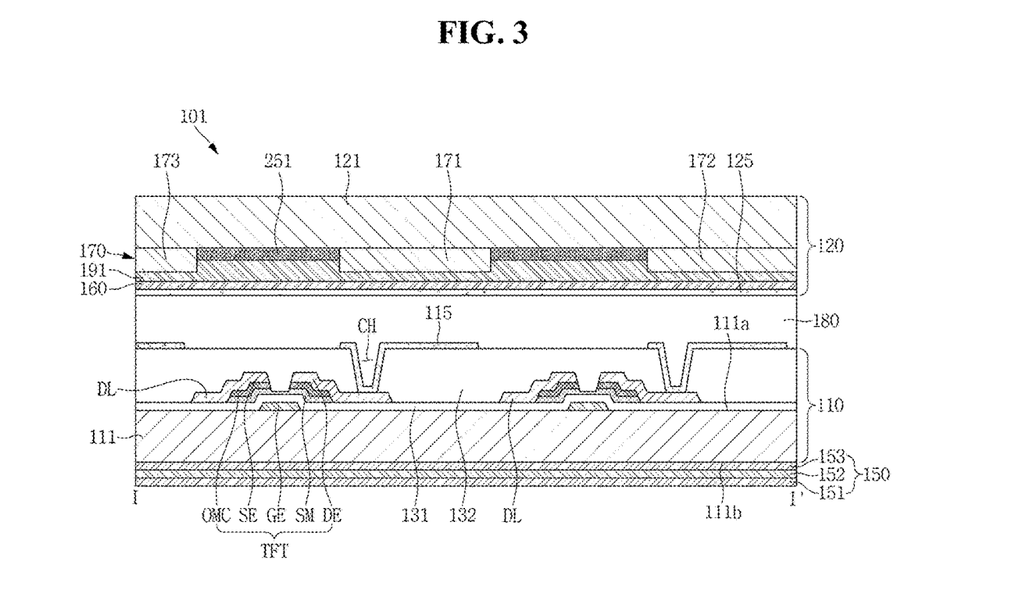
FIG. 3 is a cross-sectional view taken along line I-I' of FIG. 2.
Figure 4:
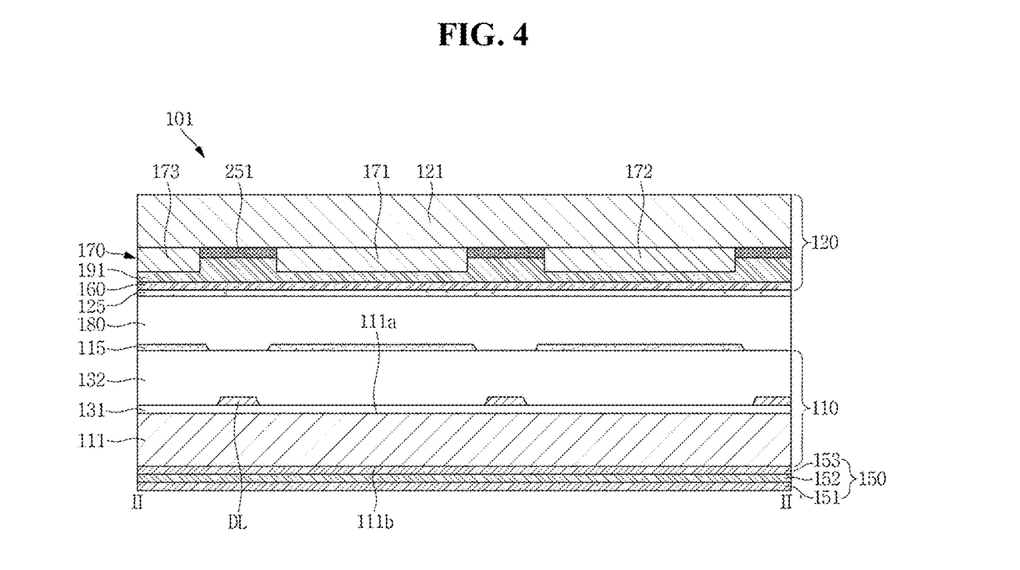
FIG. 4 is a cross-sectional view taken along line II-II' of FIG. 2.

FIG. 2 is a plan view illustrating a pixel of the display device 101 illustrated in FIG. 1, FIG. 3 is a cross-sectional view taken along line I-I' of FIG. 2, and FIG. 4 is a cross-sectional view taken along line II-II' of FIG. 2.

As illustrated in FIGS. 2 and 3, the display device 101 according to an exemplary embodiment includes the liquid crystal layer 180 between the display substrate 110 and the opposing substrate 120. Accordingly, the display device 101 according to an exemplary embodiment may be referred to as a liquid crystal display ("LCD") device. An amount of light provided from the backlight unit 140 to the color conversion layer 170 is controlled by the liquid crystal layer 180.

The display substrate 110 includes a first substrate 111, a thin film transistor ("TFT"), a first electrode 115, a gate insulating layer 131 and a passivation layer 132. The TFT includes a semiconductor layer SM, an ohmic contact layer OMC, a gate electrode GE, a source electrode SE and a drain electrode DE.

In addition, the first polarizing plate 150 is disposed on the display substrate 110. In an exemplary embodiment, in the case where a surface of the first substrate 111 on which the first electrode 115 is disposed is defined as a first surface 111a of the first substrate 111, the first polarizing plate 150 may be disposed on a second surface 111b of the first substrate 111, for example.

The first polarizing plate 150 is disposed between the backlight unit 140 (refer to FIG. 1) and the display substrate 110, and a light emitted from the backlight unit 140 passes through the first polarizing plate 150 and is incident to the display substrate 110.

Referring to FIG. 3, the first polarizing plate 150 includes a first polarizer 151, a phase compensation layer 152 and a second polarizer 153 which are sequentially disposed. According to an exemplary embodiment, the first polarizer 151 is disposed on the side of the backlight unit 140 and the second polarizer 153 is disposed on the side of the display substrate 110. The positions of the first polarizer 151 and the second polarizer 153 may vary as necessary.

The first polarizer 151 and the second polarizer 153 have absorption axes parallel to each other. That is, the absorption axis of the first polarizer 151 and the absorption axis of the second polarizer 153 are parallel to each other.

Each of the first polarizer 151 and the second polarizer 153 may linearly polarize an incident light and may selectively pass the light along a polarization axis. According to an exemplary embodiment, the first polarizer 151 and the second polarizer 153 include a polymer film. In an exemplary embodiment, the first polarizer 151 and the second polarizer 153 may include polyvinyl alcohol ("PVA"), for example.

In an exemplary embodiment, a film which is provided by orienting dichroic dyes on a PVA resin in an absorption manner may be used as the first polarizer 151 and the second polarizer 153, for example. Examples of the PVA resin may include a homopolymer of vinyl acetate or a copolymer of vinyl acetate with other monomers.

In an exemplary embodiment, the first polarizer 151 and the second polarizer 153 may be provided by, for example, uniaxially stretching a PVA resin film, dyeing the PVA resin film with a dichroic dye for the dichroic dye to be absorbed to the PVA resin film in an absorption manner, treating the PVA resin film adsorbed with the dichroic dye using an aqueous solution and washing. However, the method of manufacturing the first polarizer 151 and the second polarizer 153 is not limited thereto.

In an exemplary embodiment, since the first polarizer 151 and the second polarizer 153 overlap each other, a light transmittance of the first polarizing plate 150 may be lowered and thus a luminance of the display device 101 may be lowered.

To substantially prevent this, a first polarizer 151 having luminance enhancement characteristics may be used. That is, a luminance enhancement film having a polarization function may be used as the first polarizer 151. In addition, a separate luminance enhancement film may be further used.

In an exemplary embodiment, the phase compensation layer 152 has a thickness direction retardation value Rth in a range from about 450 nanometers (nm) to about 650 nm, for example. As the phase compensation layer 152 has such a thickness direction retardation value Rth, a light that is incident in a lateral direction and polarized in the first polarizer 151 passes through the phase compensation layer 152 and then is absorbed in the second polarizer 153 to be blocked.

The phase compensation layer 152 may include a C-plate. In such an exemplary embodiment, the C-plate has a thickness direction retardation value Rth in a range from about 450 nm to about 650 nm, for example. In an exemplary embodiment, the phase compensation layer 152 may further include at least one of an A-plate and a B-plate, for example. In an exemplary embodiment, the phase compensation layer 152 may have a double-layer structure and may include, for example, a B/C-plate, an A/C-plate and a Z/C-plate, for example.

In an exemplary embodiment, the phase compensation layer 152 may include at least one of cycloolefin polymer ("COP"), triacetyl cellulose ("TAC"), polycarbonate ("PC"), polystyrene ("PS") and a liquid crystal compensation film, for example.

In an exemplary embodiment, the first substrate 111 includes transparent glass or plastic, for example.

A plurality of gate lines GL and a plurality of gate electrodes GE are disposed on the first substrate 111. The gate electrode GE is connected to the gate line GL. In an exemplary embodiment, the gate line GL and the gate electrode GE may include or consist of one of aluminum (Al) or alloys thereof, silver (Ag) or alloys thereof, copper (Cu) or alloys thereof, molybdenum (Mo) or alloys thereof, chromium (Cr), tantalum (Ta), and/or titanium (Ti), for example. At least one of the gate line GL and the gate electrode GE may have a multilayer structure including at least two conductive layers which have different physical properties.

The gate insulating layer 131 is disposed over an entire surface of the first substrate 111 including the gate line GL and the gate electrode GE. In an exemplary embodiment, the gate insulating layer 131 may include or consist of silicon nitride (SiNx) or silicon oxide (SiOx), for example. In addition, the gate insulating layer 131 may have a multilayer structure including at least two insulating layers which have different physical properties.

The semiconductor layer SM is disposed on the gate insulating layer 131. In such an exemplary embodiment, the semiconductor layer SM overlaps the gate electrode GE below the gate insulating layer 131. In an exemplary embodiment, the semiconductor layer SM may include amorphous silicon, polycrystalline silicon, or the like, for example. In an exemplary embodiment, the semiconductor layer SM may include an oxide semiconductor, for example.

An ohmic contact layer OMC may be disposed on the semiconductor layer SM. In an exemplary embodiment, the ohmic contact layer OMC may be disposed on the semiconductor layer SM other than a channel portion thereof, for example.

In addition, a plurality of data lines DL is disposed on the gate insulating layer 131. The data line DL crosses the gate line GL. The source electrode SE is connected to the data line DL and is disposed on the ohmic contact layer OMC. The drain electrode DE, spaced apart from the source electrode SE, is disposed on the ohmic contact layer OMC and is connected to the pixel electrode.

In an exemplary embodiment, at least one of the data line DL, the source electrode SE and the drain electrode DE may include or consist of a refractory metal, such as molybdenum, chromium, tantalum and titanium, or an alloy thereof. Further, at least one of the data line DL, the source electrode SE and the drain electrode DE may have a multilayer structure including a refractory metal layer and a low-resistance conductive layer.

The passivation layer 132 is disposed over an entire surface of the first substrate 111 including the semiconductor layer SM, the data line DL, the source electrode SE and the drain electrode DE. In an exemplary embodiment, the passivation layer 132 may include an inorganic insulating material such as silicon nitride (SiNx) and silicon oxide (SiOx), for example. In an alternative exemplary embodiment, the passivation layer 132 may include an organic layer, for example. In an exemplary embodiment, the passivation layer 132 may have a double-layer structure including a lower inorganic layer and an upper organic layer, for example.

The first electrode 115 is disposed on the passivation layer 132. The first electrode 115 is connected to the drain electrode DE through a contact hole CH defined in the passivation layer 132. In an exemplary embodiment, the first electrode 115 may include a transparent conductive material such as indium tin oxide ("ITO") and indium zinc oxide ("IZO"). According to an exemplary embodiment, the first electrode 115 is a pixel electrode.

The liquid crystal layer 180 is disposed on the first electrode 115. According to an exemplary embodiment, the liquid crystal layer 180 may be driven in a vertical alignment ("VA") mode, for example.

The opposing substrate 120 is disposed on the liquid crystal layer 180.

The opposing substrate 120 includes the second substrate 121, the color conversion layer 170 and the second polarizing plate 160. The second polarizing plate 160 is disposed more adjacent to the liquid crystal layer 180 than the color conversion layer 170 is thereto. Referring to FIGS. 3 and 4, the second polarizing plate 160 is disposed on the liquid crystal layer 180, the color conversion layer 170 is disposed on the second polarizing plate 160 and the second substrate 121 is disposed on the color conversion layer 170. With respect to the second substrate 121, the color conversion layer 170 is disposed on the second substrate 121 and the second polarizing plate 160 is disposed on the color conversion layer 170.

In addition, the opposing substrate 120 may further include a light blocking layer 251 and a second electrode 125. Each of the light blocking layer 251 and the second electrode 125 may be disposed on the display substrate 110.

In an exemplary embodiment, the second substrate 121 may include transparent materials such as glass or plastic, for example.

According to an exemplary embodiment, the light blocking layer 251 is disposed on the second substrate 121 to define areas of color conversion portions 171 and 172 and a transmissive portion 173. The light blocking layer 251 is disposed in an area except the color conversion portions 171 and 172 and the transmissive portion 173. The light blocking layer 251 may have a mesh shape or a matrix shape. Accordingly, the light blocking layer 251 may be also referred to as a black matrix ("BM").

The first electrodes 115 of the first, second and third pixels PX1, PX2 and PX3 are positioned respectively corresponding to the areas of the color conversion portions 171 and 172 and the transmissive portion 173 which are defined by the light blocking layer 251. The light blocking layer 251 blocks a light at portions except for the color conversion portions 171 and 172 and the transmissive portion 173. In an exemplary embodiment, the light blocking layer 251 is disposed above the TFTs, the gate line GL and the data line DL to block a light having passed therethrough from being emitted to the outside, for example. However, the invention is not limited thereto, and the light blocking layer 251 is not invariably necessary and may be omitted in another exemplary embodiment.

The color conversion layer 170 converts a wavelength of the light incident from the backlight unit 140 to emit a light having a different wavelength. According to an exemplary embodiment, the color conversion layer 170 includes a phosphor (i.e., a fluorescent material). Since the display device 101 according to an exemplary embodiment includes a color conversion layer including a phosphor, it may be also referred to as a photo-luminescent display ("PLD") device Referring to FIGS. 3 and 4, the color conversion layer 170 includes a plurality of color conversion portions 171 and 172. The color conversion portions 171 and 172 include a phosphor that absorbs a light having a predetermined wavelength and emits a light having a wavelength different from the predetermined wavelength. Adjacent ones of the color conversion portions 171 and 172 are separated by the light blocking layer 251.

According to an exemplary embodiment, the color conversion layer 170 includes a first color conversion portion 171 and a second color conversion portion 172. In an exemplary embodiment, the first color conversion portion 171 is a red conversion portion corresponding to a red pixel PX1 and emits red light, for example. In an exemplary embodiment, the second color conversion portion 172 is a green conversion portion corresponding to a green pixel PX2 and emits green light, for example.

In an exemplary embodiment, the first color conversion portion 171, which is a red conversion portion, includes a red phosphor and the second color conversion portion 172, which is a green conversion portion, includes a green phosphor, for example. According to an exemplary embodiment, the red phosphor absorbs a blue light to emit a red light and the green phosphor absorbs a blue light to emit a green light.

Referring to FIGS. 3 and 4, the color conversion layer 170 includes the transmissive portion 173. A wavelength of the light passing through the transmissive portion 173 does not change. The transmissive portion 173 according to an exemplary embodiment transmits a blue light, for example. Accordingly, when the backlight unit 140 emits a blue light, the transmissive portion 173 may correspond to the blue pixel PX3. In order to improve the side viewing angle characteristics, the transmissive portion 173 may include light scattering particles.

Although not illustrated, in an exemplary embodiment, the color conversion layer 170 may further include a third color conversion portion which absorbs a blue light and emits a light other than red and green, for example.

The color conversion portions 171 and 172 may include a resin including a phosphor. The phosphor is a substance that fluoresces when irradiated with light or radiation, and emits a light having a specific wavelength of the corresponding phosphor. In addition, the phosphor emits a light over an entire area irrespective of the direction of the irradiated light. According to an exemplary embodiment, a quantum dot may be used as the phosphor. In addition, a quantum rod may be used as the phosphor.

Of the quantum dot and the quantum rod, the quantum dots absorb a light incident to the quantum dot and then emit a light having a wavelength different from a wavelength of the incident light. That is, the quantum dots are wavelength converting particles which may convert the wavelength of the light incident to the quantum dot. A wavelength of the light converted by the quantum dot may vary depending on the size of the quantum dot. In an exemplary embodiment, by adjusting a diameter of the quantum dot, the quantum dot may emit a light of a desired color, for example.

The quantum dot generally has a high extinction coefficient and a high quantum yield, thus emitting significantly intense fluorescence. In particular, the quantum dot may absorb a light having a relatively short wavelength and then emit a light having a longer wavelength.

The quantum dot may have a structure including a core and a shell surrounding the core. The shell may have two or more layers. In addition, the quantum dot may further include an organic ligand bound to the shell and may include an organic coating layer surrounding the shell.

The quantum dot may include at least one substance of group II compound semiconductors, group III compound semiconductors, group V compound semiconductors and group VI compound semiconductors. In an exemplary embodiment, the core forming the quantum dot may include at least one of PbSe, InAs, PbS, CdSe, InGaP, CdTe, CdS, ZnSe, ZnTe, ZnS, HgTe and HgS, for example. In an exemplary embodiment, the shell may include at least one of CuZnS, CdSe, CdTe, CdS, ZnSe, ZnTe, ZnS, HgTe and HgS, for example.

Even quantum dots having a substantially same composition may produce different lights depending on the diameters of the quantum dots.

In addition, the color conversion layer 170 may further include a reflective element. An example of the reflective element may include $TiO_2$. The reflective element may have a particle shape and may be dispersed in a resin including the phosphor.

Referring to FIGS. 3 and 4, with respect to the second substrate 121, the second polarizing plate 160 is disposed on the color conversion layer 170 and the second electrode 125 is disposed on the second polarizing plate 160. That is, the second polarizing plate 160 is disposed between the second electrode 125 and the color conversion layer 170.

The second polarizing plate 160 may include a polymer film. In an exemplary embodiment, a polarizer including PVA may be used as the second polarizing plate 160, for example.

In an exemplary embodiment, an in-cell polarizer ("ICP") such as a wire grid polarizer ("WGP") may be used as the second polarizing plate 160, for example.

A transmission axis of the second polarizing plate 160 may be perpendicular to a transmission axis of the first polarizing plate 150 disposed on the display substrate 110. Either the transmission axis of the second polarizing plate 160 or the transmission axis of the first polarizing plate 150 may be arranged in parallel with the gate line GL.

In addition, an overcoat layer 191 may be disposed between the color conversion layer 170 and the second polarizing plate 160. The overcoat layer 191 serves to protect the color conversion layer 170 and to planarize an upper portion of the color conversion layer 170. The overcoat layer 191 may include a light transmitting organic material. According to an exemplary embodiment, an adhesive layer may be used as the overcoat layer 191. However, the invention is not limited thereto, and the overcoat layer 191 may be omitted in another exemplary embodiment.

According to an exemplary embodiment, the second electrode 125 is disposed between the second polarizing plate 160 and the liquid crystal layer 180. The second electrode 125 may be disposed over an entire surface of the second substrate 121 including the second polarizing plate 160. In an exemplary embodiment, the second electrode 125 may include a transparent conductive material such as ITO or IZO. According to an exemplary embodiment, the second electrode 125 is a common electrode.

The second electrode 125 may be provided by deposition. In an exemplary embodiment, a transparent conductive material may be directly deposited on one surface of the first polarizing plate 150 to form the second electrode 125, for example. In such an exemplary embodiment, a room temperature deposition may be performed, for example. In an exemplary embodiment, the second electrode 125 may be disposed directly on a surface of the second polarizing plate 160 without thermal deformation of the second polarizing plate 160.

The second electrode 125 applies an electric field to the liquid crystal layer 180 together with the first electrodes 115.

Hereinafter, the first polarizing plate 150 and a way of blocking the side light by the first polarizing plate 150 will be described in detail with reference to FIGS. 5, 6 and 7.

Figure 5:
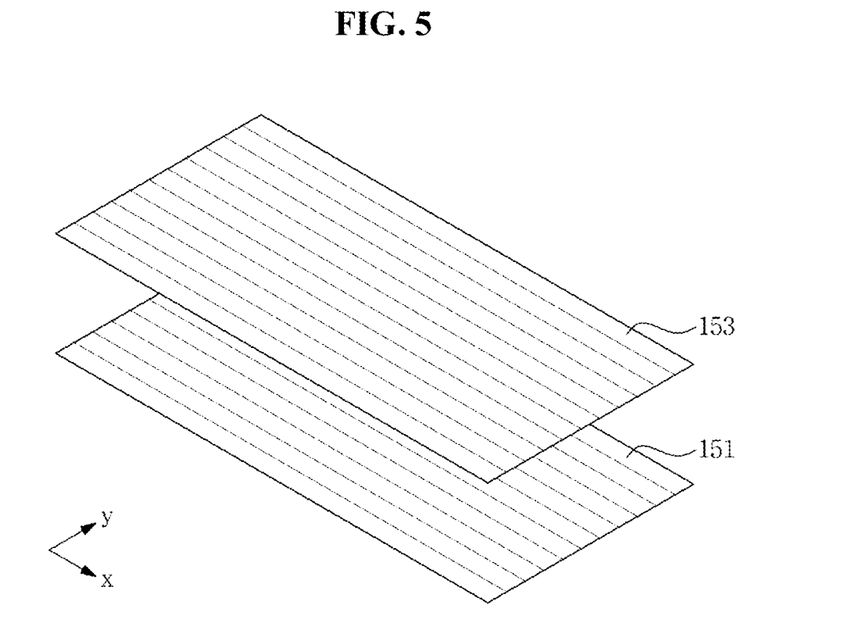
FIG. 5 is a perspective view illustrating a first polarizer and a second polarizer.
Figure 6:
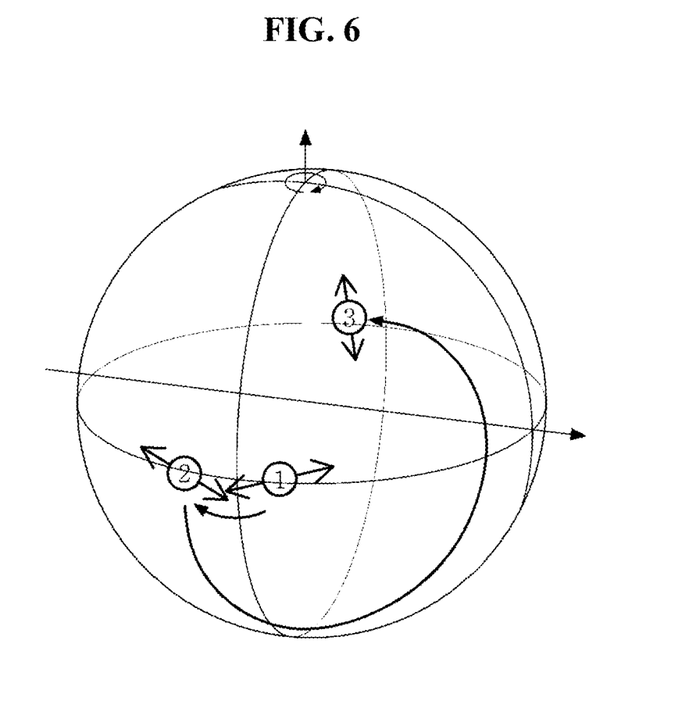
FIG. 6 illustrates a path of a side light on the Poincare sphere.
Figure 7:
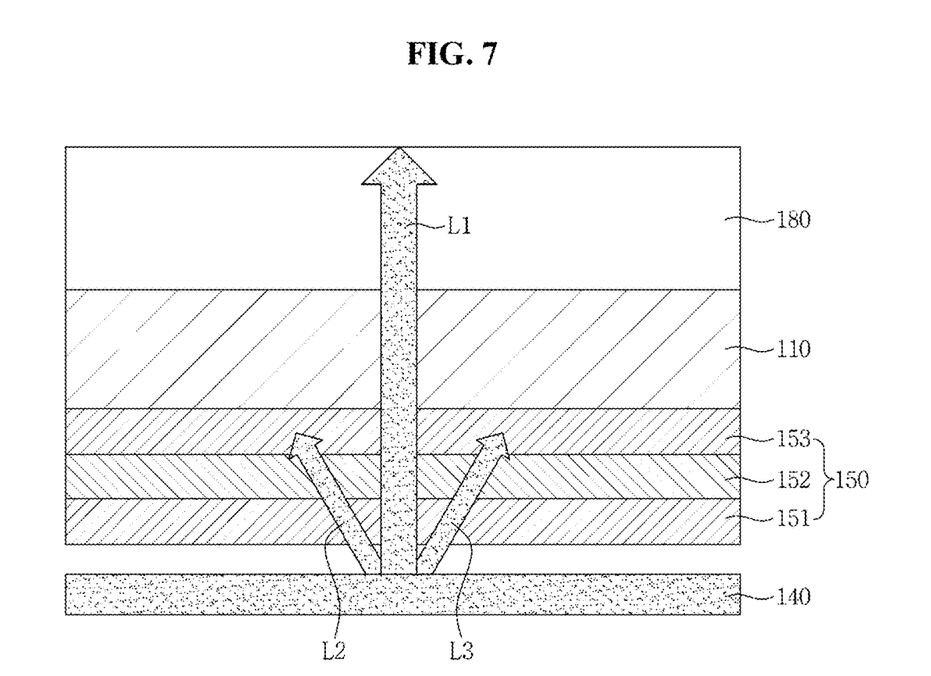
FIG. 7 is an explanatory cross-sectional view illustrating absorption of the side light.

FIG. 5 is a perspective view illustrating the first polarizer 151 and the second polarizer 153, FIG. 6 illustrates a path of the side light on the Poincare sphere, and FIG. 7 is an explanatory cross-sectional view illustrating absorption of side lights L2 and L3.

As described above, the first polarizing plate 150 includes the first polarizer 151, the phase compensation layer 152 and the second polarizer 153 which are sequentially arranged. The absorption axis of the first polarizer 151 and the absorption axis of the second polarizer 153 are parallel to each other. Referring to FIG. 5, the absorption axis of the first polarizer 151 and the absorption axis of the second polarizer 153 are parallel to an x-axis, for example. However, the invention is not limited thereto, and in another exemplary embodiment, the absorption axis of the first polarizer 151 and the absorption axis of the second polarizer 153 may be parallel to a y-axis, for example.

A path of the side light is illustrated in FIG. 6. One of the factors determining the path of the side light is the phase compensation layer 152 (refer to FIG. 7).

According to an exemplary embodiment, the phase compensation layer 152 is disposed between the first polarizer 151 (refer to FIG. 7) and the second polarizer 153 (refer to refer to FIG. 7). In an exemplary embodiment, the phase compensation layer 152 has a thickness direction retardation value Rth in a range from about 450 nanometers (nm) to about 650 nm to block the side light, for example. In an exemplary embodiment, the phase compensation layer 152 blocks a visible light that is incident to a side surface, for example.

In an exemplary embodiment, a C-plate may be used as the phase compensation layer 152, for example.

The C-plate has an x-axis refractive index Nx, a y-axis refractive index Ny and a z-axis refractive index Nz, where "Nx=Ny≠Nz".

As the C-plate satisfies the relation of "Nx=Ny," the C-plate does not have optical anisotropy with respect to a light propagating along the z-axis direction. That is, a wavelength of the light does not change when the light propagates in the z-axis direction, that is, through a front surface of the C-plate. Accordingly, when the absorption axes of the first polarizer 151 and the second polarizer 153 are parallel to each other, a light that has been incident to a front surface of the first polarizer 151 and then polarized in the first polarizer 151 and passed through the C-plate is not absorbed by the second polarizer 153.

In an exemplary embodiment, the thickness direction retardation value Rth is obtained by the following equation 1.

$$Rth=|(Nx+Ny)/2-Nz|\times d \quad \text{[Equation 1]}$$

In the case of the C-plate, since "Nx=Ny≠Nz", the C-plate has a thickness direction retardation value Rth. Accordingly, lights L2 and L3 having polarized in the first polarizer 151 and diagonally passed through the C-plate may be changed in terms of the phase and absorbed by the second polarizer 153 (refer to FIG. 7).

A C-plate that satisfies the relationship of "Nz>(Nx+Ny)/2" is referred to as a positive C-plate and a C-plate that satisfies the relation of "Nz<(Nx+Ny)/2" is referred to as a negative C-plate. According to an exemplary embodiment, both of the positive C-plate and the negative C-plate may be used as the phase compensation layer 152.

In the Poincare sphere illustrated in FIG. 6, "1" represents a transmission axis of a light incident to a side surface of the first polarizer 151 and transmitted through the first polarizer 151, "2" represents a change of a transmission axis of a light that is linearly polarized while passing through the phase compensation layer 152, and "3" represents a transmission axis of a light having passing through the phase compensation layer 152.

Referring to FIG. 6, when the light incident on the side surface passes through the first polarizer 151 and the phase compensation layer 152, the light may have the transmission axis 3 perpendicular to the transmission axis 1 of the first polarizer 151. In such an exemplary embodiment, the second polarizer 153 has a transmission axis and an absorption axis substantially equal to those of the first polarizer 151. Accordingly, the light incident to the side surface and transmitted through the first polarizer 151 and the phase compensation layer 152 has a transmission axis perpendicular to the second polarizer 153, and accordingly propagation of the light is blocked by the second polarizer 153.

Referring to FIG. 7, the light L1 emitted from the backlight unit 140 to be incident to the front surface of the first polarizing plate 150 passes through the first polarizing plate 150 and is incident to the display substrate 110 (refer to FIGS. 1, 3 and 4) and the liquid crystal layer 180. The lights L2 and L3 of the light emitted from the backlight unit 140 that are incident to the side surface of the first polarizing plate 150 are blocked by the first polarizing plate 150 and fail to be incident to the display substrate 110.

As such, as the side light is not blocked, the light having passed through a liquid crystal layer of one pixel may be substantially prevented from affecting a color conversion portion of another pixel, and thus color mixture may be substantially prevented and the display quality of the display device 101 may be improved.

Figure 8:
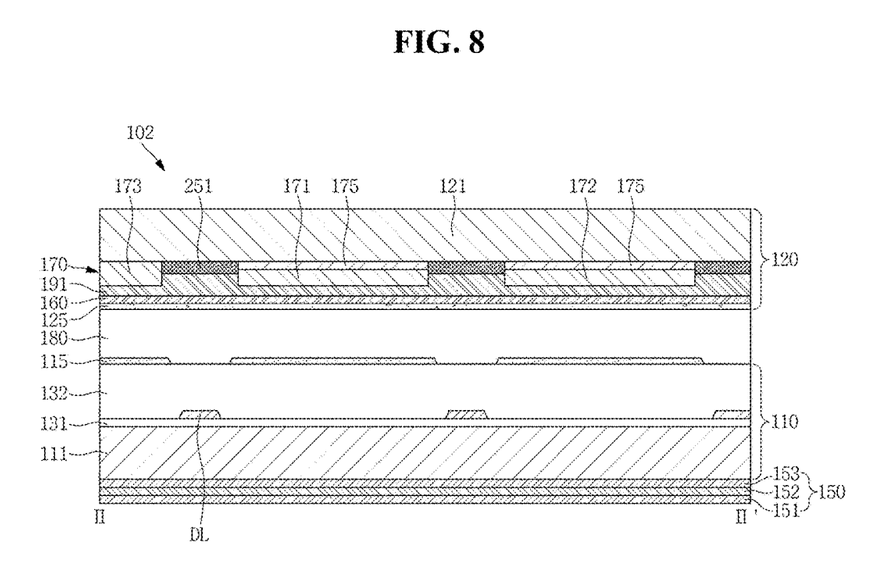
FIG. 8 is a cross-sectional view illustrating an alternative exemplary embodiment of a display device.

FIG. 8 is a cross-sectional view illustrating a display device 102 according to an alternative exemplary embodiment. Hereinafter, in order to avoid duplication, descriptions of the components described above are omitted.

The display device 102 of FIG. 8 includes a yellow color filter 175. Referring to FIG. 8, the yellow color filter 175 is disposed between a second substrate 121 and a first color conversion portion 171 which is a red conversion portion and between the second substrate 121 and a second color conversion portion 172 which is a green conversion portion.

The yellow color filter 175 absorbs a blue light and transmits a red light and a green light. According to an alternative exemplary embodiment, a blue light is emitted from a backlight unit 140 (refer to FIGS. 1 and 7). Of the blue light incident to the first color conversion portion 171, a light that is converted into a red light passes through the yellow color filter 175 and a blue light that is not converted into a red light is absorbed by the yellow color filter 175. In addition, of the blue light incident to the second color conversion portion 172, a light that is converted into a green light is passes through the yellow color filter 175 and a blue light that is not converted into a green light is absorbed by the yellow color filter 175. Accordingly, clear red and green may be realized in the red and green pixels respectively corresponding to the first color conversion portion 171 and the second color conversion portion 172 and the display quality of the display device 102 is improved.

Figure 9:
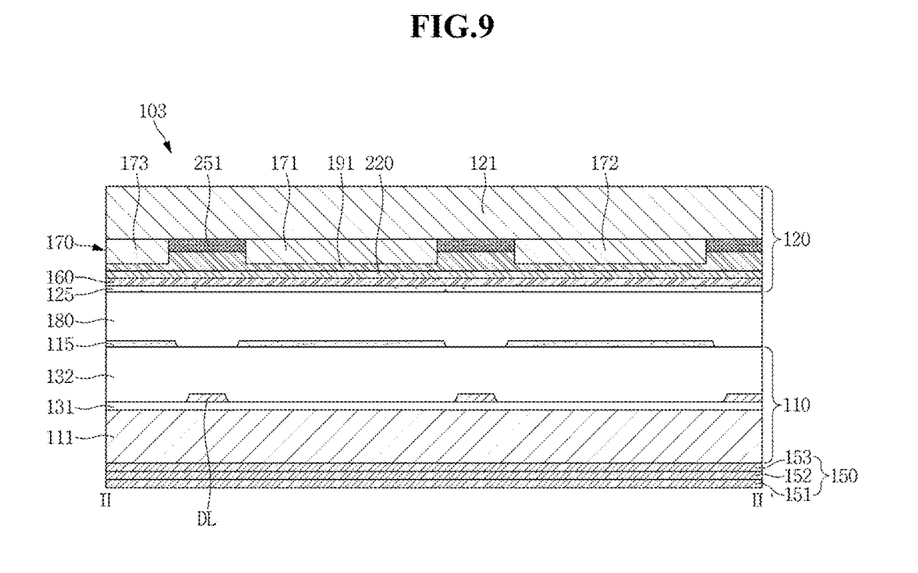
FIG. 9 is a cross-sectional view illustrating an alternative exemplary embodiment of a display device.

FIG. 9 is a cross-sectional view illustrating a display device 103 according to an alternative exemplary embodiment.

The display device 103 illustrated in FIG. 9 includes a dichroic reflection layer 220 between a color conversion layer 170 and a second polarizing plate 160.

The dichroic reflection layer 220 is also referred to as a dichroic filter. The dichroic reflection layer 220 transmits a light having a predetermined wavelength of a light incident to the dichroic reflection layer 220 and reflects a light having a wavelength other than the predetermined wavelength.

In the case where the backlight unit 140 (refer to FIGS. 1 and 7) emits a blue light, a dichroic reflection layer 220 that transmits a blue light and reflects a light other than the blue light may be used. In such an exemplary embodiment, the light incident from the backlight unit 140 passes through the dichroic reflection layer 220, while red and green lights converted by the color conversion layer 170 in terms of the wavelength are reflected by the dichroic reflection layer 220.

As red and green lights are reflected by the dichroic reflection layer 220, the red and green lights generated in the color conversion layer 170 and emitted toward the liquid crystal layer 180 are reflected by the dichroic reflection layer 220 once again toward the second substrate 121 to be emitted outwards. Accordingly, luminous efficiency of the display device 103 may be improved. Since the red and green lights are reflected, the dichroic reflection layer 220 is also referred to as a yellow reflection filter ("YRF").

The dichroic reflection layer 220 includes a plurality of high refractive index layers and a plurality of low refractive index layers which are alternately stacked. Selective light transmission may be achieved in the dichroic reflection layer 220 by a multilayer film interference phenomenon caused by the plurality of high refractive index layers and the plurality of low refractive index layers. In an exemplary embodiment, the low refractive index layer may include at least one of $MgF_2$ and $SiO_2$ and the high refractive index layer may include at least one of Ag, $TiO_2$, $Ti_2O_3$ and $Ta_2O_3$, for example, but the invention is not limited thereto.

In an exemplary embodiment, although not illustrated, an adhesive layer may be disposed between the dichroic reflection layer 220 and the second polarizing plate 160.

Figure 10:
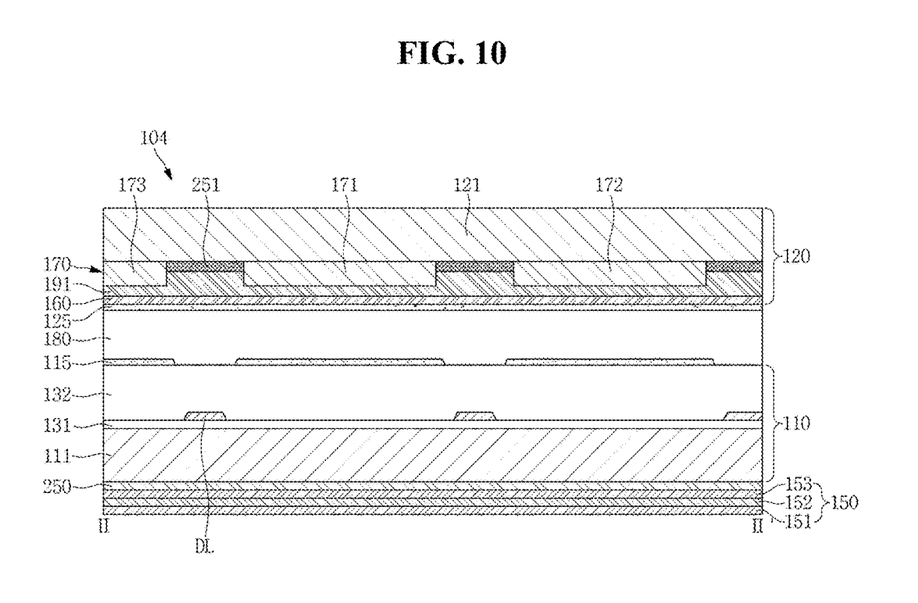
FIG. 10 is a cross-sectional view illustrating an alternative exemplary embodiment of a display device.

FIG. 10 is a cross-sectional view illustrating a display device 104 according to an alternative exemplary embodiment.

The display device 104 according to an alternative exemplary embodiment includes a retardation plate 250 between a first polarizing plate 150 and a first substrate 111.

The retardation plate 250 is disposed on one surface of the first polarizing plate 150 to retard a phase of the light. The retardation plate 250 may convert a linearly polarized light into a circularly polarized light, or may convert a circularly polarized light into a linearly polarized light. At least one of a quarter wave plate ("QWP") and a half wave plate ("HWP") may be used as the retardation plate 250.

According to an alternative exemplary embodiment, the retardation plate 250 in the form of a film may be used. In an exemplary embodiment, the retardation plate 250 may be manufactured by stretching a film, or may include a photo-curable liquid crystal compound. The retardation plate 250 may be attached to the first polarizing plate 150. For attachment, although not illustrated, an adhesive layer may be disposed between the retardation plate 250 and the first polarizing plate 150.

Figure 11:
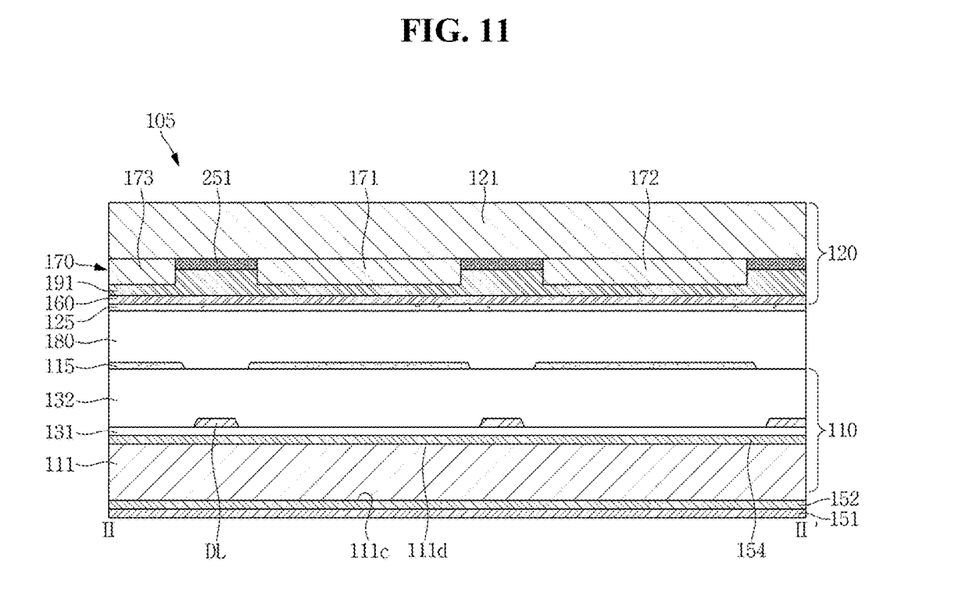
FIG. 11 is a cross-sectional view illustrating an alternative exemplary embodiment of a display device.

FIG. 11 is a cross-sectional view illustrating a display device 105 according to an alternative exemplary embodiment.

According to an alternative exemplary embodiment, a second polarizer 154 is disposed separately from a first polarizer 151 and a phase compensation layer 152. Referring to FIG. 11, the phase compensation layer 152 is disposed on a first surface 111*c* of a first substrate 111 and the first polarizer 151 is disposed on the phase compensation layer 152. In addition, a second polarizer 154 is disposed on a second surface 111*d* of the first substrate 111 and a first electrode 115 is disposed on the second polarizer 154.

Figure 12:
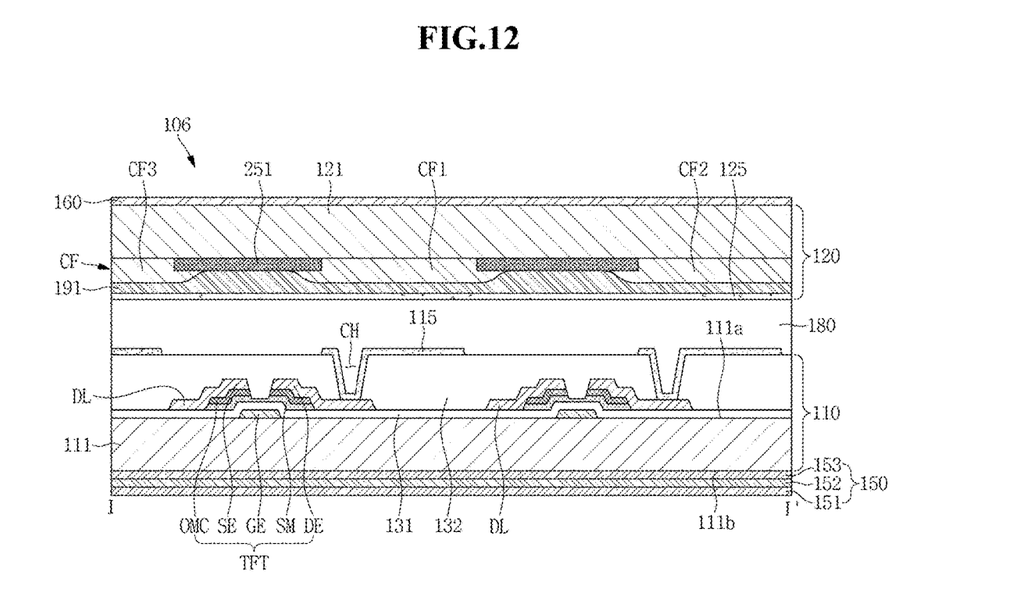
FIG. 12 is a cross-sectional view illustrating an alternative exemplary embodiment of a display device.

Although the second polarizer 154 is disposed separately from the first polarizer 151 and the phase compensation layer 152, the side light having passed through the first polarizer 151 and the phase compensation layer 152 is blocked by the second polarizer 154, FIG. 12 is a cross-sectional view illustrating a display device 106 according to an alternative exemplary embodiment.

As compared with the display device 101 illustrated in FIG. 3, the display device 106 illustrated in FIG. 12 includes a color filter layer CF instead of a color conversion layer 170, and includes a first color filter CF1, a second color filter CF2 and a third color filter CF3 instead of the first color conversion portion 172, the second color conversion portion 172 and the transmissive portion 173.

FIG. 12 illustrates an example that the color filter layer CF is included in a second substrate 121. However, exemplary embodiments are not limited thereto, and the color filter layer CF may be included in a first substrate 111. That is, the color filter layer CF may be included in either the first substrate 111 or the second substrate 121.

In addition, a second polarizing plate 160 may be disposed on the second substrate 121.

The first color filter CF1, the second color filter CF2 and the third color filter CF3 have no light scattering properties. Accordingly, when only a collimated light is incident to the color filter layer CF, the side visibility of the display device 106 may be degraded. Accordingly, in order to improve side visibility, a light scattering layer may be disposed (not illustrated).

As set forth hereinabove, according to one or more exemplary embodiments, the display device includes a polarizing plate having a double-layer structure. The side light is blocked by the double-layered polarizing plate and thus unnecessary light emission of the pixel caused by the side light may be substantially prevented. Accordingly, the display device according to an exemplary embodiment may have excellent color rendering capability.

While the invention has been illustrated and described with reference to the exemplary embodiments thereof, it will be apparent to those of ordinary skill in the art that various changes in form and detail may be formed thereto without departing from the spirit and scope of the invention.

What is claimed is:

1. A display device comprising:
a first substrate;
a first electrode on a first surface of the first substrate;
a first polarizing plate which is deposed on a second surface of the first substrate which faces the first surface, the first polarizing plate comprising a first polarizer, a phase compensation layer and a second polarizer which are sequentially disposed;
a liquid crystal layer on the first electrode;
a second polarizing plate on the liquid crystal layer;
a color conversion layer on the second polarizing plate, the color conversion layer comprising a plurality of color conversion portions; and
a second substrate on the color conversion layer,
wherein an absorption axis of the first polarizer and an absorption axis of the second polarizer are parallel to each other.

2. The display device as claimed in claim 1, wherein the phase compensation layer has a thickness direction retardation value in a range from about 450 nanometers to about 650 nanometers.

3. The display device as claimed in claim 1, wherein the phase compensation layer comprises a C-plate.

4. The display device as claimed in claim 1, wherein the phase compensation layer comprises at least one of cycloolefin polymer ("COP"), triacetyl cellulose ("TAC"), polycarbonate ("PC"), polystyrene ("PS") and a liquid crystal compensation film.

5. The display device as claimed in claim 1, wherein the first polarizer and the second polarizer comprise polyvinyl alcohol.

6. The display device as claimed in claim 1, wherein the first polarizer is a luminance enhancement film having a polarization function.

7. The display device as claimed in claim 1, wherein the color conversion layer comprises a phosphor.

8. The display device as claimed in claim 7, wherein the phosphor comprises quantum dots.

9. The display device as claimed in claim 1, wherein the color conversion layer further comprises:
a red color conversion portion which absorbs a blue light and emits a red light; and
a green color conversion portion which absorbs a blue light and emits a green light.

10. The display device as claimed in claim 9, wherein the color conversion layer further comprises a transmissive portion which transmits a blue light.

11. The display device as claimed in claim 9, further comprising a yellow color filter between the red color conversion portion and the second substrate and between the green color conversion portion and the second substrate.

12. The display device as claimed in claim 1, further comprising a dichroic reflection layer between the second polarizing plate and the color conversion layer.

13. A display device comprising:
a first substrate;
a first electrode on a first surface of the first substrate;
a first polarizing plate which is deposed on a second surface of the first substrate which faces the first surface, the first polarizing plate comprising a first polarizer, a phase compensation layer and a second polarizer which are sequentially disposed;
a liquid crystal layer on the first electrode;
a second polarizing plate on the liquid crystal layer;

a color conversion layer on the second polarizing plate, the color conversion layer comprising a plurality of color conversion portions;
a second substrate on the color conversion layer; and
a retardation plate between the first polarizer and the first substrate,
wherein an absorption axis of the first polarizer and an absorption axis of the second polarizer are parallel to each other.

14. A display device comprising:
a first substrate;
a first electrode on a first surface of the first substrate;
a first polarizing plate which is disposed on a second surface of the first substrate which faces the first surface, the first polarizing plate comprising a first polarizer, a phase compensation layer and a second polarizer which are sequentially disposed;
a liquid crystal layer on the first electrode;
a second substrate on the liquid crystal layer; and
a color filter layer on one of the first substrate and the second substrate,
wherein
an absorption axis of the first polarizer and an absorption axis of the second polarizer are parallel to each other.

15. A display device comprising:
a first substrate;
a phase compensation layer on a first surface of the first substrate;
a first polarizer on the phase compensation layer;
a second polarizer on a second surface of the first substrate which faces the first surface;
a first electrode on the second polarizer;
a liquid crystal layer on the first electrode;
a second polarizing plate on the liquid crystal layer;
a color conversion layer on the second polarizing plate, the color conversion layer comprising a plurality of color conversion portions; and
a second substrate on the color conversion layer,
wherein an absorption axis of the first polarizer and an absorption axis of the second polarizer are parallel to each other.

* * * * *